United States Patent
Sachs et al.

(10) Patent No.: US 9,998,991 B2
(45) Date of Patent: Jun. 12, 2018

(54) METHOD AND APPARATUSES FOR DISCONTINUOUS RECEPTION CYCLE ESTIMATION BY DATA PACKET MONITORING

(71) Applicant: Telefonaktiebolaget LM Ericsson (publ), Stockholm (SE)

(72) Inventors: Joachim Sachs, Sollentuna (SE); Jari Arkko, Kauniainen (FI); Anders E. Eriksson, Kista (SE); Ari Keränen, Helsinki (FI); Hans Bertil Rönneke, Kungsbacka (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 89 days.

(21) Appl. No.: 14/914,888

(22) PCT Filed: Aug. 28, 2013

(86) PCT No.: PCT/EP2013/067815
§ 371 (c)(1),
(2) Date: Feb. 26, 2016

(87) PCT Pub. No.: WO2015/028054
PCT Pub. Date: Mar. 5, 2015

(65) Prior Publication Data
US 2016/0286487 A1    Sep. 29, 2016

(51) Int. Cl.
*G08C 17/00*    (2006.01)
*H04W 52/02*    (2009.01)
(Continued)

(52) U.S. Cl.
CPC ....... *H04W 52/0216* (2013.01); *H04W 4/005* (2013.01); *H04W 52/0229* (2013.01);
(Continued)

(58) Field of Classification Search
CPC .......... H04W 52/0216; H04W 76/048; H04W 52/0229; H04W 72/0446; H04W 56/001; H04W 72/12; H04W 84/04
(Continued)

(56) References Cited

U.S. PATENT DOCUMENTS

2013/0201851 A1*  8/2013  Chou ............... H04W 24/02
                                                    370/252
2013/0308508 A1*  11/2013 Ji  ..................... H04W 88/02
                                                    370/311
(Continued)

FOREIGN PATENT DOCUMENTS

WO    WO 2009/024925 A2    2/2009
WO    WO 2009/114800 A2    9/2009
WO    WO 2010/053426 A2    5/2010

OTHER PUBLICATIONS

International Search Report and Written Opinion of the International Searching Authority, Application No. PCT/EP2013/067815, dated Jun. 5, 2014.
(Continued)

*Primary Examiner* — Faisal Choudhury
(74) *Attorney, Agent, or Firm* — Sage Patent Group

(57) ABSTRACT

A receiver electronic communication device and a sender electronic communication device are connected over a cellular network and the Internet. The receiver device uses discontinuous reception (DRX) to receiver data packets from the sender device. At least a starting time of an active period of a DRX cycle implemented at the receiver device is estimated responsive to monitoring the data packets transmitted from the sender device to the receiver device.

24 Claims, 13 Drawing Sheets

(51) Int. Cl.
*H04W 4/00* (2018.01)
*H04W 76/04* (2009.01)
*H04W 56/00* (2009.01)
*H04W 72/04* (2009.01)
*H04W 28/18* (2009.01)
*H04W 72/12* (2009.01)
*H04W 84/04* (2009.01)

(52) U.S. Cl.
CPC ..... *H04W 56/001* (2013.01); *H04W 72/0446* (2013.01); *H04W 76/048* (2013.01); *H04W 28/18* (2013.01); *H04W 72/12* (2013.01); *H04W 84/04* (2013.01); *Y02B 60/50* (2013.01)

(58) Field of Classification Search
USPC .................................................. 370/331, 311
See application file for complete search history.

(56) References Cited

U.S. PATENT DOCUMENTS

| | | | | |
|---|---|---|---|---|
| 2014/0010132 | A1* | 1/2014 | Ma | H04W 52/0209 370/311 |
| 2014/0022909 | A1* | 1/2014 | Mahmoud | H04W 76/048 370/241 |
| 2014/0248914 | A1* | 9/2014 | Aoyagi | H04W 68/02 455/458 |
| 2015/0055531 | A1* | 2/2015 | Morioka | H04W 52/0241 370/311 |
| 2015/0173039 | A1* | 6/2015 | Rune | H04W 52/0216 370/311 |
| 2015/0181526 | A1* | 6/2015 | Lee | H04W 52/0241 370/311 |

OTHER PUBLICATIONS

3GPP, Technical Report—"3rd Generation Partnership Project; Technical Specification Group Services and System Aspects; Machine-Type and other Mobile Data Applications Communications Enhancements (Release 12)", 3GPP TR 23.887 V1.1.0(Jul. 2013), 153 pp.

Alcatel-Lucent et al., "S1AP CN-assisted Parameters Tuning for solution 5.1.2.3.1 (long connected SDDTE)", Agenda item: 19, Document for Discussion and Approval, R3-131416, 3GPP TSG-RAN WG RAN#81, Barcelona, Spain, Aug. 19-23, 2013, 4 pp.

Huawei, "MTC SDDTE impact on RAN3", Agenda item: 19, Document for: TP, R3-121273, 3GPP TSG-RAN WG3 Meeting #81, Barcelona, Spain, Aug. 19-23, 2013, 5 pp.

Intel Corporation, "LTE Fast Dormancy", Agenda Item: 7.7.2, Document for: Discussion, R2-106825, 3GPP TSG-RAN WG2 Meeting #72, Jacksonville, FL, USA, Nov. 15-19, 2010, 7 pp.

Liao, "Phase and Frequency Estimation: High-Accuracy and Low-Complexity Techniques", A Thesis Submitted to the Faculty of the Worcester Polytechnic Institute, May 2011, 127 pp.

Nokia Corporation, "UE assistance information for UE power saving and optimized network performance", Agenda Item: 7.2.1, Document for: Discussion and Decision, R2-121203. 3GPP TSG-RAN WG2 Meeting #77bis, Jeju, Korea, Mar. 26-30, 2012, 5 pp.

Siemens, "Adaptive DRX and DTX Setting for LTE_ACTIVE", Agenda Item: 13.2, Document for Discussion and Decision, R2-062819, 3GPP TSG-RAN WG#55, Seoul, Korea, Oct. 9-13, 2006, 2 pp.

* cited by examiner

METHOD AND APPARATUSES FOR DISCONTINUOUS RECEPTION CYCLE ESTIMATION BY DATA PACKET MONITORING

CROSS REFERENCE TO RELATED APPLICATION

This application is a 35 U.S.C. § 371 national stage application of PCT International Application No. PCT/EP2013/067815, filed on Aug. 28, 2013, the disclosure and content of which is incorporated by reference herein in its entirety. The above-referenced PCT International Application was published in the English language as International Publication No. WO 2015/028054 A1 on Mar. 5, 2015.

TECHNICAL FIELD

The present invention relates to methods for controlling data transmission between a sender a receiver and to corresponding devices.

BACKGROUND

In mobile networks, such as a 3GPP (Third Generation Partnership Project) cellular network, various types of cellular devices may be used. For example, Machine Type Communication (MTC) cellular devices may be used in addition to conventional types of cellular devices, in the following also termed as user equipment (UE), such as mobile phones, smartphones, data modems, mobile computers, or the like. MTC cellular devices typically transmit and receive only small amounts of data, which may occur more or less infrequently, e.g., once per week to once per minute. MTC cellular devices are typically assumed to be autonomous sensor devices, alarm devices, actuator devices, remote control devices, or the like, which communicate with an application server, rather than being used for communication by a human user. Hence, this type of communication may also be referred to as machine-to-machine (M2M) communication and the devices may be denoted machine devices (MDs). The application server may be within or outside the mobile network.

Considering the above, MTC cellular devices are typically characterized by a modest bit rate and sparse communication. MTC cellular devices may therefore be implemented with low-performance data transmission capabilities. Further, MTC cellular devices typically need to be very energy efficient, since external power supplies may not be available and/or it may be practically or economically not feasible to frequently replace or recharge their batteries.

A known way of energy saving in a UE, which may also be applied to MTC cellular devices, is to use Discontinuous Reception (DRX). By means of DRX, a UE can enter an energy efficient sleep mode when no data transmission is needed. In the sleep mode, receiver circuitry of the UE may be turned off. DRX can be applied in connected mode, but also in idle mode, in which the UE only receives paging information on certain paging occasions. The latter scenario may also be referred to as paging DRX or idle DRX. In this connection, also "long DRX" cycles with sleep periods in the order of seconds or even minutes are considered for improving energy efficiency of MTC cellular devices.

In the long DRX solution, Paging Indication (PI) messages may be sent less often than in regular scenarios. This allows the MTC cellular device to stay remain in the sleep mode for a longer time because it needs to receive the PI messages as often as in regular scenarios. The DRX cycle length may thus correspond to the time between two subsequent PI messages. If there is incoming data for the MTC cellular device, it is paged using the PI message and when the MTC cellular device responds to the PI message, a data communication channel, or Packet Data Protocol (PDP) context, is created and used to send the data to the MTC cellular device.

In some application scenarios, there may be an application-specific requirement on how frequently a device needs to be able to receive data. This requirement may also be known to the cellular network. For example, such information may be preconfigured in the cellular network or in subscription information of the MTC cellular device. Further, the application server could dynamically indicate such information to the cellular network. Still further, the MTC cellular device could indicate such information to the cellular network when setting up a PDP context. The cellular network may then use this information to set the largest supported DRX cycle length which allows for complying with the application-specific requirement. This allows for optimized benefit from energy saving due to DRX.

Accordingly, some information related to the maximum utilized DRX cycle length may be available on the application level, in particular in the application server. However, knowledge of a maximum DRX cycle length does not allow for determining when in detail the MTC cellular device will be able to receive data. This is particularly relevant for long DRX cycles in which the sleep period is significantly longer than the active period in which the MTC device can receive data. This may adversely affect interaction between the MTC cellular device and the application server.

For example, the MTC cellular device could be a display device which gets updates of a value to be displayed, e.g., a measured temperature, from the application server. Such display device could be implemented in a couple of different ways. In one implementation, the display device could be configured as a "normally-off" device that occasionally wakes up and connects to the cellular network to receive a value update, and then disconnects from the cellular network, leaving just the display on to show the updated value. However, such mode of operation may cause significant power consumption, e.g., for regular attach/detach signaling, requesting a value update even when the value is not changed, or the like. Further, showing of a value change on the display update may be delayed due to waiting for transmission of the value update in the next occasion of waking up. In another implementation, a long DRX cycle may be applied for the display device. By suitably adjusting the DRX cycle length, a trade-off between power consumption and real-time updating of the displayed value may be obtained. However, also in the latter case there may be undesired delays due to the DRX cycle not being synchronized with the sending of the value update, e.g., if the application server sends the value update just after the sleep period of the DRX cycle has begun. Assuming an exemplary DRX cycle length of one minute, the application server could send the value update one second after beginning of the sleep period, and the value update would be received by the display device only at the beginning of the next active period of the DRX cycle, e.g., 59 seconds later. This requires long buffering of the value update in the cellular network and may even involve the risk of the value update not being successfully received by the display device due to insufficient buffering capacity. Further, the displayed value may be outdated already when the value update is received.

Accordingly, it may desirable to provide information allowing for synchronization with the active period of the DRX cycle to the application level, in particular to the sender. However, such information is not available in many practical application scenarios, e.g., due to the lack of suitable interfaces between the application layer and the lower layers implementing the DRX functionalities.

Accordingly, there is a need for a solution which allows for efficiently determining information about a DRX cycle utilized by a certain cellular device.

SUMMARY

According to an embodiment of the invention, a method for data transmission between a sender and a receiver is provided. According to the method, data packets transmitted from the sender to the receiver are monitored. On the basis of this monitoring, at least a starting time of an active period of a DRX cycle implemented at the receiver is estimated.

According to a further embodiment of the invention, a receiver is provided. The receiver comprises an interface for at least receiving data packets from a sender and at least one processor. The at least one processor is configured to monitor the data packets received from the sender. Further, the at least one processor is configured to estimate, on the basis of this monitoring, at least a starting time of an active period of a DRX implemented at the receiver.

According to a further embodiment of the invention, a sender is provided. The sender comprises an interface for at least sending data packets to a receiver and at least one processor. The at least one processor is configured to monitor the data packets transmitted to the receiver. Further, the at least one processor is configured to estimate, on the basis of this monitoring, at least a starting time of an active period of a DRX implemented at the receiver.

According to a further embodiment of the invention a computer program is provided. The computer program comprises program code to be executed by at least one processor of a receiver. Execution of the program code causes the receiver to monitor data packets transmitted from a sender to the receiver. Further, execution of the program code causes the receiver to estimate, on the basis of said monitoring, at least a starting time of an active period of a discontinuous reception cycle implemented at the receiver.

According to a further embodiment of the invention a computer program is provided. The computer program comprises program code to be executed by at least one processor of a sender. Execution of the program code causes the sender to monitor data packets transmitted from the sender to a receiver. Further, execution of the program code causes the sender to estimate, on the basis of said monitoring, at least a starting time of an active period of a discontinuous reception cycle implemented at the receiver.

DETAILED DESCRIPTION OF EMBODIMENTS

In the following, the invention will be explained in more detail by referring to exemplary embodiments and to the accompanying drawings. The illustrated embodiments relate to concepts for data transmission between a sender and a receiver. In these concepts, the receiver uses DRX for receiving DL data packets over a cellular network from the sender. The receiver may for example be a MTC cellular device, e.g., implementing an actuator and/or output device, e.g., a display. Such cellular device may also implement a storage device for storing the received data. In some implementations, the cellular device may also be provided with a data acquisition means, e.g., a sensor. Such acquired data may then be transmitted in an uplink (UL) direction over the cellular network and included in UL data packets. For example, the DL data packets could be sent by a server and the UL data packets could be received by this server.

Figure 1:
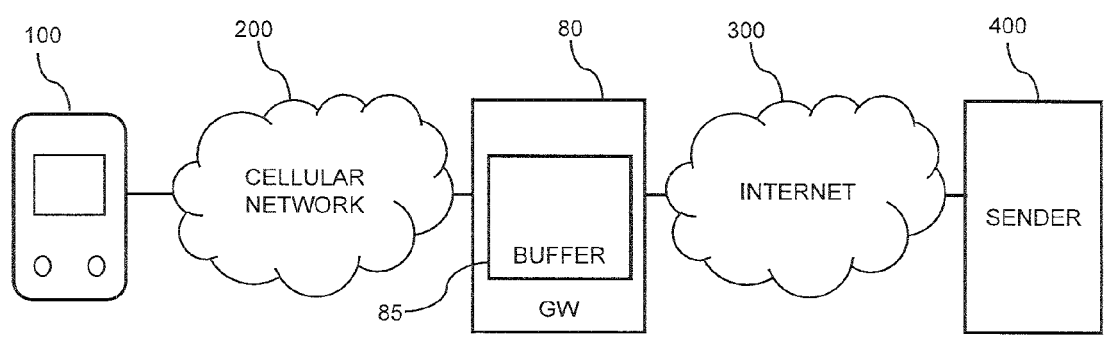
FIG. 1 schematically illustrates data transmission between a sender and a receiver according to an embodiment of the invention.

An exemplary scenario for data transmission between the sender and the receiver is illustrated in FIG. 1. In the scenario of FIG. 1, the receiver 100, e.g., a MTC cellular device, and the sender 400, e.g., a server, are illustrated as being connected over the cellular network 200 and the Internet 300.

The cellular network 200 may be implemented according to the 3GPP Evolved Packet System (EPS) technical specifications. In this case, the radio access network part of the cellular network is often referred to as Long Term Evolution (LTE) radio access network.

The communication between the sender 400 and the receiver 100 may go over a number of intermediate nodes in the Internet 300 and/or in the cellular network 200. As an example of such intermediate node, FIG. 1 illustrates a gateway 80 arranged between the cellular network 200 and the Internet 300. As illustrated, the gateway 80 may also comprise a buffer 85 which is used for buffering DL data packets transmitted over the cellular network 200. That is to say, the DL data packets are buffered before being received by the receiver 100. In this way, it becomes possible for the cellular network 200 to schedule the DL radio transmissions to the receiver 100 according to the availability of the receiver 100 and also according to the current capacity in the cellular network 200.

Figure 2:
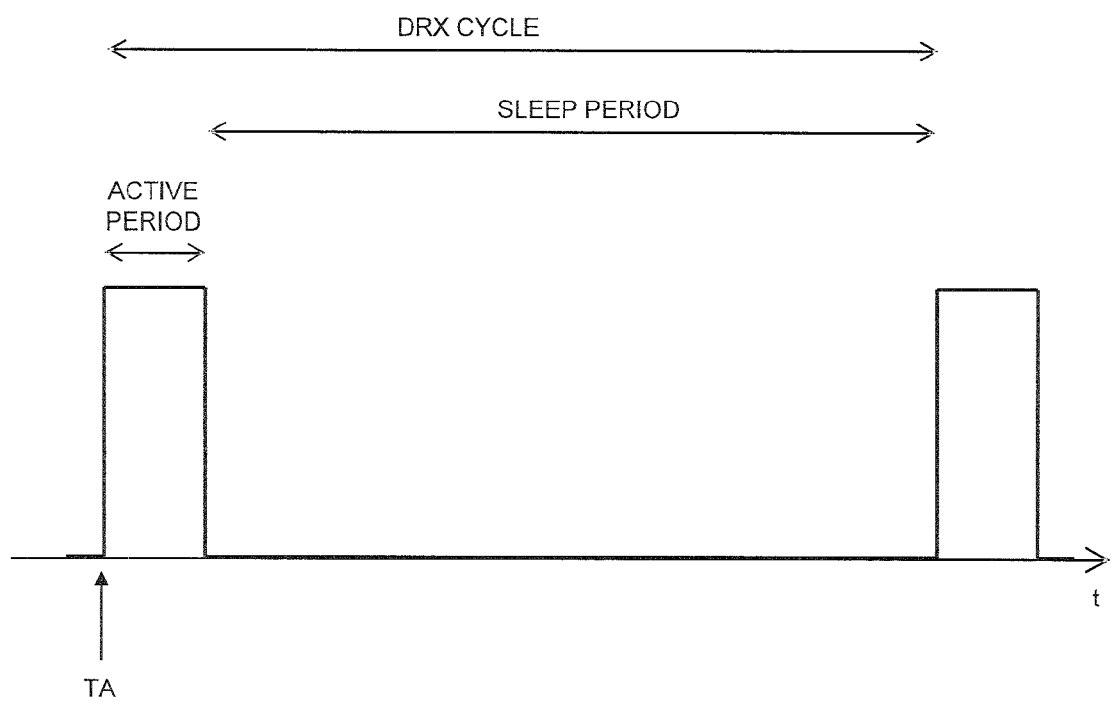
FIG. 2 illustrates a DRX cycle which may be used in embodiments of the invention.

As mentioned above, the receiver 100 uses DRX for receiving DL data packets over the cellular network. That is to say, the receiver 100 enters and leaves a sleep mode according to a DRX cycle. The DRX cycle may for be defined through a paging configuration indicated from the cellular network 200 to the receiver 100. An active period of the DRX cycle may be defined as a time interval in which the receiver 100 monitors a radio channel of the cellular network 200, e.g., to receive a Paging Indication (PI) message or DL payload data. A sleep period of the DRX cycle may in turn be defined as a time interval in which the receiver 100 is in the sleep mode and does not monitor certain radio channels of the cellular network 200, e.g., a Physical Downlink Control Channel (PDCCH) or a Paging Channel (PCH). In the sleep mode, the terminal device 200 may deactivate radio circuitry to save energy. The DRX cycle, the active period, and the sleep period are illustrated in FIG. 2. In FIG. 2, the start of the active period is indicated by TA.

According to the concepts as described herein, monitoring of the DL data packets transmitted from the sender 400 to the receiver 100 is used to estimate parameters of the DRX cycle, in particular the starting time TA of the active period and typically also the length of the DRX cycle. The starting time TA of the active period may also be expressed in terms of a phase of the periodic DRX cycle. The estimated parameters of the DRX cycle may then be used for adjusting the interaction of the sender 400 and the receiver, e.g., by controlling the timing of sending the DL data packets from the sender 400 and/or controlling acquisition of data to be transmitted in the DL data packets according to the estimated parameters of the DRX cycle. Here, the estimated starting time TA of the DRX cycle allows for sending the DL data packets in such a way that their arrival at the receiver 100 is during the active period of the DRX cycle. Since the monitoring of the DL data packets can be implemented on the application level, no specific interface to lower communication protocol layers implementing the DRX functionalities is required for estimating the parameters of the DRX cycle.

The monitoring of the DL data packets and estimation may be accomplished by the receiver 100 or may be assisted by the receiver 100. Specifically, the receiver 100 may keep track of when it has received the DL data packets, i.e., record packet arrival times. From the pattern of packet arrival times, the receiver 100 may then estimate the parameters of the DRX cycle, in particular the starting time TA of the active period and typically also the length of the DRX cycle. The receiver 100 may then indicate the estimated parameter(s) of the DRX cycle to the sender 400.

In some implementations, the receiver 100 may also report the packet arrival times to the sender 400, and the monitoring and estimation may be accomplished at the sender 400. For this purpose, the sender 400 and the receiver 100 may determine identifiers of the DL data packets that are sent and receiver, respectively. For example, such an identifier may be a hash value or other kind digest of the DL data packet content. In some cases, also a packet sequence number could be used as the identifier. The receiver 100 may then report the packet arrival times together with the identifiers to the sender 400. At the sender, the identifiers may then be used to match the received DL data packets and sent DL data packets and thereby associate each sent DL data packet with a packet arrival time. In this way, also an evaluation of the packet sending time in relation to the packet arrival time becomes possible, e.g., to determine a delay associated with the transmission of the DL data packet over the Internet 300 and the cellular network 200.

In some implementations, the sender 400 could also derive the pattern of packet arrival times and perform the monitoring and estimation without explicit assistance from the receiver 100. for example, in many scenarios a transport protocol is utilized for transmission of the DL data packets which requires sending of acknowledgements by the receiver 100 to the sender 400. Such acknowledgements indicate whether each DL data packet was successfully received or not. A typical example of such transport protocol is the Transmission Control Protocol (TCP) which is frequently used together with the Internet Protocol (IP) for packet data transmission. Since the pattern of packet arrival times of the DL data packets at the receiver can assumed to be correlated to a pattern of arrival times of the corresponding acknowledgements at the sender 400, the sender may derive the pattern of packet arrival times of the DL data packets from the acknowledgements as received by the sender 400.

Concerning the evaluation of the pattern of packet arrival times, specifically inter-arrival times of the DL data packets may be evaluated. Here, the inter-arrival time may be measured as the time interval between receiving one of the DL data packets and the subsequent one of the DL data packets. On the basis of the inter-arrival times of the DL data packets, packet bursts may be detected. Such packet bursts reflect the DRX cycle utilized by the receiver 100. This will be further explained by referring to the illustration of FIG. 3, which shows an exemplary pattern of packet arrival times at the receiver 100.

Figure 3:
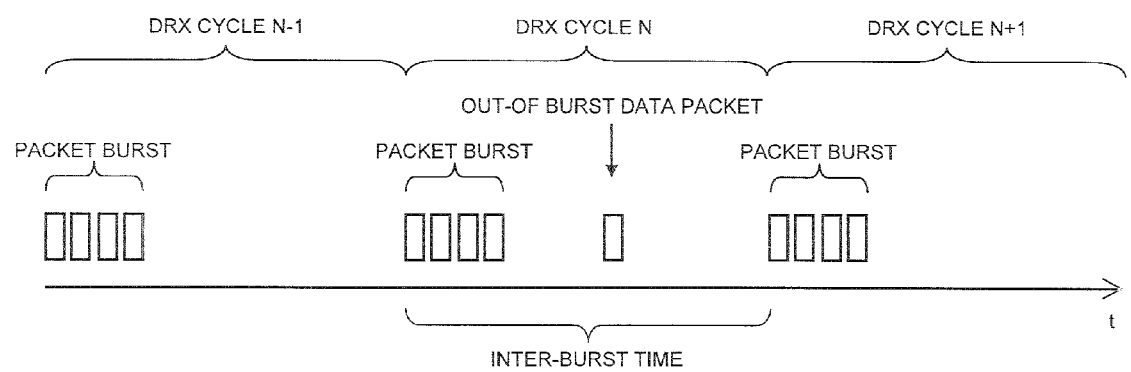
FIG. 3 illustrates an exemplary arrival pattern of downlink (DL) data packets which may occur when receiving the DL data packets in DRX operation.

As shown in FIG. 3, reception of the DL packets by the receiver 100 typically occurs in packet bursts which are aligned with the beginnings of the DRX cycles. A packet burst may be described as a sequence of data packets separated by inter-arrival times below a threshold, e.g., in the range of a few ms. Separate packet bursts will in turn be separated by a time interval which is longer than this threshold, e.g., in the range of one or more seconds. FIG. 3 also shows that an inter-burst time may be measured as the time interval between the beginning of one of the packet bursts and the beginning of the subsequent packet burst.

The main reason for the packet bursts can assumed to be the DRX cycle implemented by the receiver 100. In particular, the receiver 100 will primarily receive the DL data packets in the active periods of the configured DRX cycle. The DL data packets which the sender transmits outside the active periods will typically be buffered until the beginning of the next active period and the be delivered to the receiver 100. Assuming that the DRX cycle is considerably longer than the average time interval between sending the DL data packets by the sender 400, most of the DL data packets will be buffered until the next active period of the DRX cycle begins and then arrive at the receiver 100 shortly after each other. Out-of burst packets (one example illustrated in FIG. 3) in turn may assumed to be rare and may occur for example if the receiver 100 itself has initiated communication or if there was a change in the DRX cycle configuration, e.g., due to mobility of the receiver 100 in the cellular network. Accordingly, the beginning of a packet burst can be assumed to correspond to the starting time TA of the active period of the DRX cycle. The effect of occasional out-of burst packets may for example be taken into account by statistically analyzing the pattern of inter-arrival times over multiple packet bursts.

As mentioned above, the estimated parameters of the DRX cycle may be used by the sender to control the timing of acquisition data to be sent in the DL data packets and/or the timing of sending the DL data packets. Accordingly, the data can be acquired and sent shortly before the active period of the DRX cycle so that arrival of the DL data packets at the receiver 100 occurs during the active period of the DRX cycle. The amount of buffering of the data at the sender 400 or in the cellular network 200 can thereby be reduced in a significant manner. As a result, low-latency data delivery between the sender 400 and the receiver 100 becomes possible.

Figure 4:
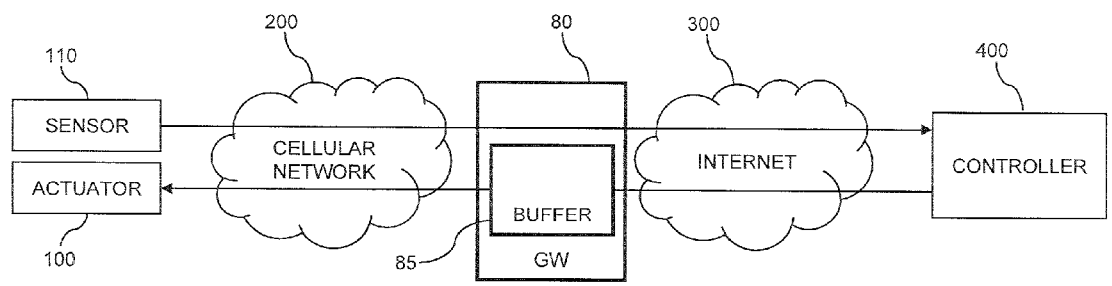
FIG. 4 illustrates an exemplary application scenario in which concepts according to an embodiment of the invention may be applied.

In a further advantageous application scenario, the concepts may be used to reduce round-trip latency in a closed-loop control system, in which communication between a controller and one or more sensors as well as between the controller and one or more actuators is carried over a cellular network. An example of a corresponding application scenario is illustrated in FIG. 4. In the scenario of FIG. 4, a sensor 110 and an actuator 100 are connected over the cellular network 200 and the Internet 300 to a controller 400. The gateway 80 is again shown as an example of an intermediate buffering node. The sensor 110 and the actuator may be implemented in one or more MTC cellular devices. As indicated by the reference numerals, the actuator 100 may correspond to the above-mentioned receiver 100, and the controller 400 may correspond to the above-mentioned sender 400. Accordingly, the actuator 100 may receive control inputs from the controller 400 which are generated on the basis of sensor output data provided by the sensor. The reception of the control inputs by the actuator 100 is performed on the basis of the DRX cycle configured for the actuator 100.

An round-trip latency in the control loop may however have adverse effects, such as undesired positive feedback and stability problems resulting therefrom. By controlling at least the sending of the control inputs from the controller 400 to the actuator 100 in accordance with the estimated starting time TA of the active period of the DRX cycle utilized by the actuator 100, the round-trip latency can be reduced. Further, the controller 400 may also control the timing of acquisition of the sensor data by the sensor 110 in accordance with the estimated starting time TA of the active period of the DRX cycle utilized by the actuator 100, thereby also achieving a further reduction of the round-trip latency. In particular, the timing can be controlled in such a way that the sensor 110 provides the sensor data at a time which allows for immediate generation of the control inputs and their sending to the actuator 100 to arrive during the active period of the DRX cycle, without any significant delay in the controller 400 or in the cellular network 200, e.g., due to buffering in the gateway 80 to wait for the next active period of the DRX cycle.

Figure 5:
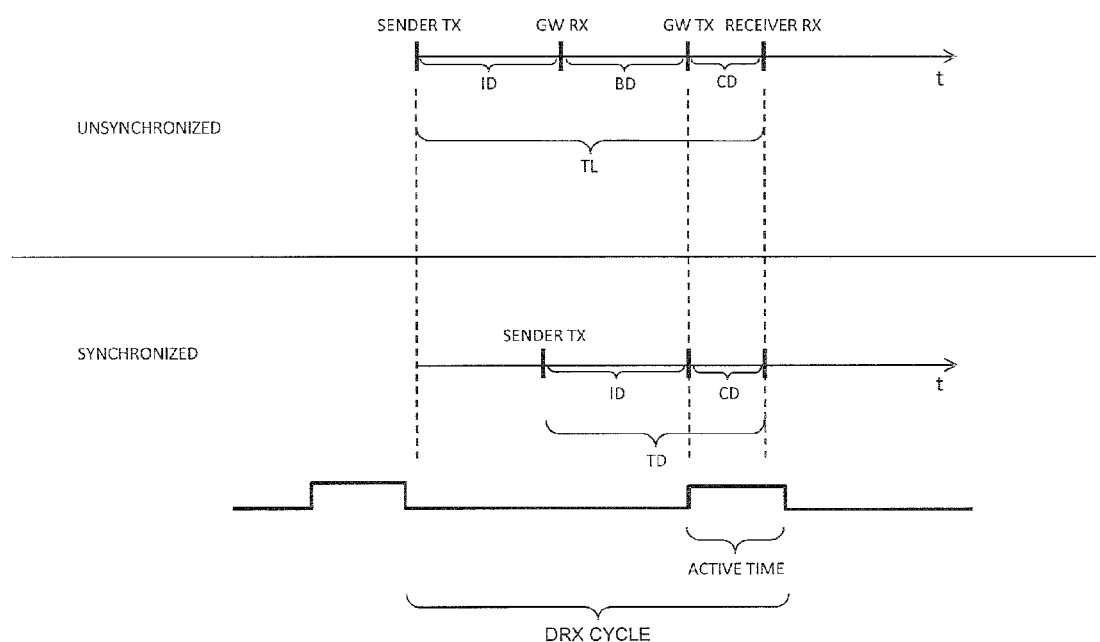
FIG. 5 illustrates delays associated with transmission of DL data packets in different operation scenarios.

FIG. 5 illustrates the benefits of considering the parameters of the DRX cycle when transmitting the DL data packets from the sender to the receiver 100. Specifically, an unsynchronized scenario, in which the starting time of the DRX cycle is not considered for the timing of sending of DL data packets by the sender 400, is compared to a synchronized scenario, in which the timing of sending the DL data packets by the sender 400 is set in such a way that the DL data packets arrive in the active period of the DRX cycle of the receiver 100, without requiring additional buffering to wait for the next active period of the DRX cycle.

As can be seen, in the unsynchronized scenario a total delay TD of a DL data packet associated with the transmission from the sender 400 to the receiver includes a delay associated with the transmission over the Internet 300, referred to as Internet delay ID, a delay due to buffering in the gateway 80 to wait for the receiver 100 becoming available in the next active period of the DRX cycle, referred to as buffering delay BD, and a delay associated with the transmission over the cellular network 200, referred to as cellular network delay CD. In the worst case, the buffering delay BD may become almost as long as the length of the DRX cycle. In the synchronized scenario, the buffering delay BD is eliminated by shifting the sending of the DL data packet by the sender 400 to a later point of time, so that the cellular network 200 can immediately forward the DL data packet in the active period of the DRX cycle.

Figure 6:
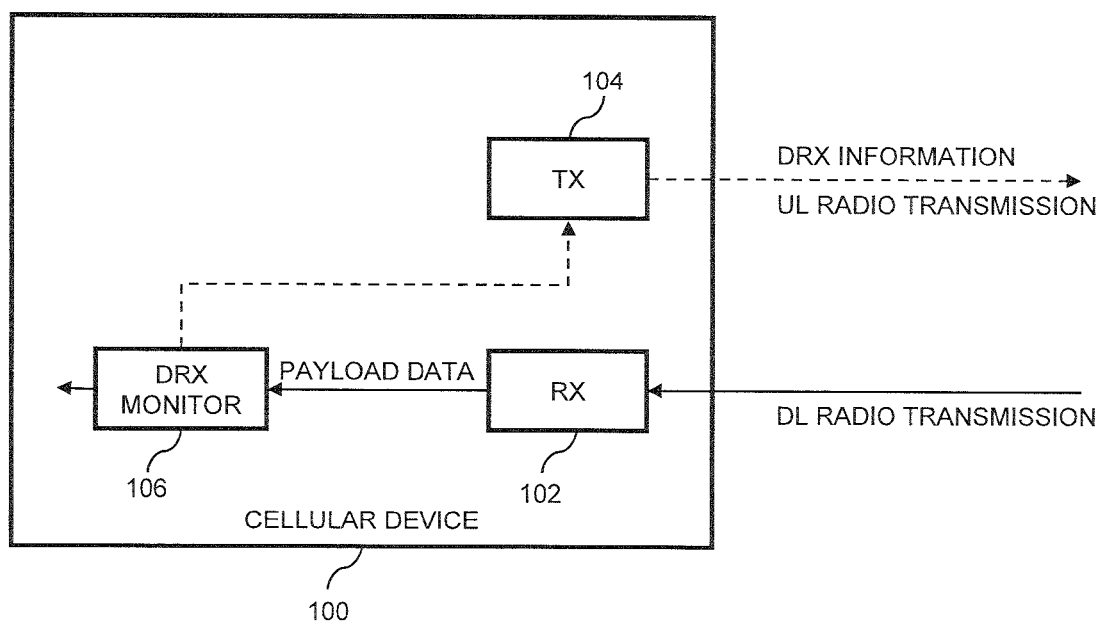
FIG. 6 schematically illustrates a cellular device implementation according to an embodiment of the invention.

FIG. 6 shows a block diagram which schematically illustrates functionalities of a cellular device 100 implementing the receiver of the above-mentioned concepts. As illustrated, the cellular device 100 is provided with a receive (RX) module 102 for receiving DL radio transmissions from a cellular network, e.g., the cellular network 200, and a transmit (TX) module 104 for sending UL radio transmissions to the cellular network. The RX module 102 may operate to extract DL payload data from the DL radio transmissions, in particular DL data packets. The payload data may then be provided to an application running on the cellular device 100.

As further illustrated, the cellular device 100 is provided with a DRX monitor 106. The DRX monitor 106 performs the above functionalities of monitoring the received DL data packets. The DRX monitor 106 may be implemented on the application level, i.e., utilize the DL payload data provided by the RX module 102, without requiring access to lower protocol layers of the protocol stack utilized in the RX module 102.

In the implementation as illustrated in FIG. 6, the DRX monitor 106 provides DRX information obtained by the monitoring of the DL data packets. This monitoring may specifically include recording the packet-arrival times at which the DL data packets are received, i.e., output in the DL payload data provided by the RX module 102. The DRX information may include the starting time TA or phase of the DRX cycle and typically also the length of the DRX cycle. By an UL radio transmission from the TX module 104, the DRX information is indicated to the sender 400. Alternatively, the DRX information may also include the packet-arrival times of the DL data packets, to be further evaluated at the sender 400.

Figure 7:
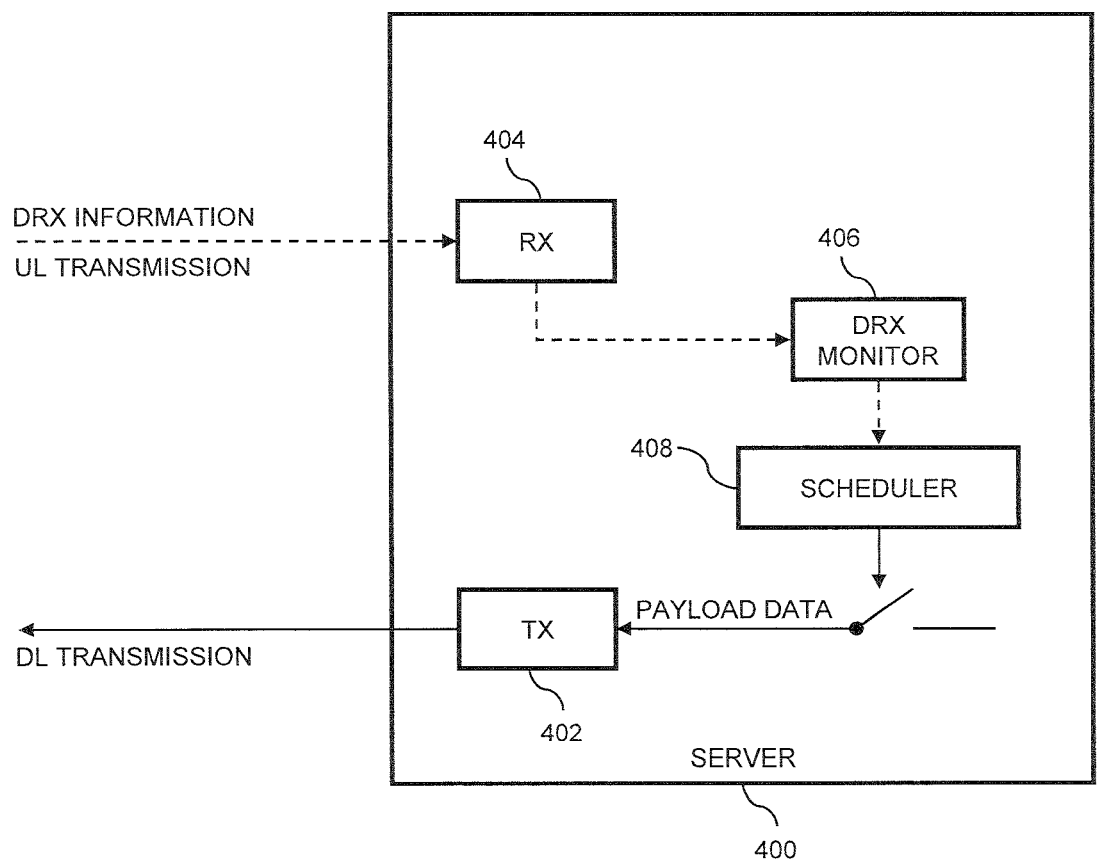
FIG. 7 schematically illustrates a server implementation according to an embodiment of the invention.

FIG. 7 shows a block diagram which schematically illustrates functionalities of a server 400 implementing the sender of the above-mentioned concepts. As illustrated, the server 400 is provided with a TX module 402 for sending DL transmissions toward the receiver, e.g., over the cellular network 200 to the cellular device 100 of FIG. 6, and an RX module 404 for receiving UL transmissions from the receiver. The TX module 402 may operate to include DL payload data into the DL transmissions, in particular into DL data packets. The DL payload data may be provided from an application running on the server 400.

As further illustrated, the server 400 is provided with a DRX monitor 406. The DRX monitor 406 performs the above functionalities of monitoring the DL data packets as received by the receiver 100. For this purpose, the DRX monitor 406 is provided with DRX information received from the receiver 100 of the DL data packets. As illustrated, the DRX information may be included in the UL transmissions as received by the RX module 404. The DRX information may include the starting time TA or phase of the DRX cycle and typically also the length of the DRX cycle. Alternatively, the DRX information may also include the packet-arrival times of the DL data packets.

Further, the server is provided with a scheduler 408. The scheduler 408 performs the above functionalities of controlling the timing of acquisition of data to be included in the DL data packets and/or controlling the timing of sending of the DL data packets. For this purpose, the scheduler 408 uses the estimated parameters of the DRX cycle as provided by the DRX monitor 406, in particular the starting time TA of the DRX cycle and typically also the length of the DRX cycle.

Figure 8:
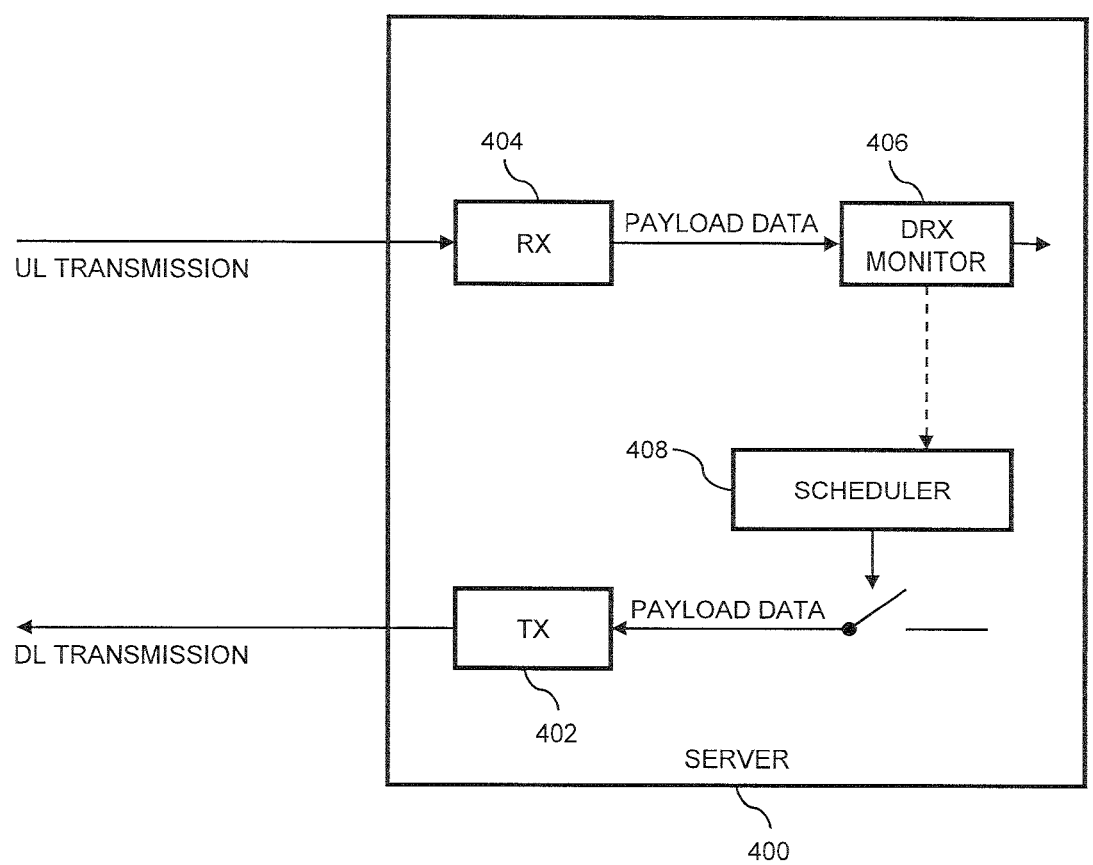
FIG. 8 schematically illustrates a further server implementation according to an embodiment of the invention.

FIG. 8 shows an alternative implementation of the server 400, which is generally similar to that of FIG. 7. However, in this case the DRX monitor 406 may operate without requiring the DRX information indicated by the receiver 100, but rather locally analyses payload data received from the receiver 100 to infer packet arrival times or a pattern of packet arrival times.

As illustrated, the RX module 404 of FIG. 8 provides UL payload data, e.g., as output to be used by an application running on the server 400. The UL payload data are provided to the DRX monitor 406. The DRX monitor 406 may now detect certain UL data packets in the UL payload data which constitute acknowledgements to DL data packets sent to the receiver 100. As mentioned above, such acknowledgments are for example utilized in the case of TCP/IP data packets. From the pattern of arrival times of the acknowledgements, the DRX monitor 406 may derive the corresponding pattern arrival times of the DL data packets at the receiver 100. For example, if the acknowledgements arrive in a burst, also the corresponding DL data packets may be assumed to be received in a packet burst. Further, an estimate of the packet arrival times at the receiver 100 may be obtained by subtracting a given delay, associated with the transmission of the acknowledgements over the cellular network 200 and the Internet 300, from the arrival times of the acknowledgements. An estimate for such delay may for example be obtained by measuring the minimum round-trip time between sending a DL data packet from the server 400 and receiving the corresponding acknowledgement. The minimum round trip time may be assumed to correspond to a case with negligible buffering delay BD and to twice the delay associated with the transmission over the cellular network 200 and the Internet 300.

Figure 9:
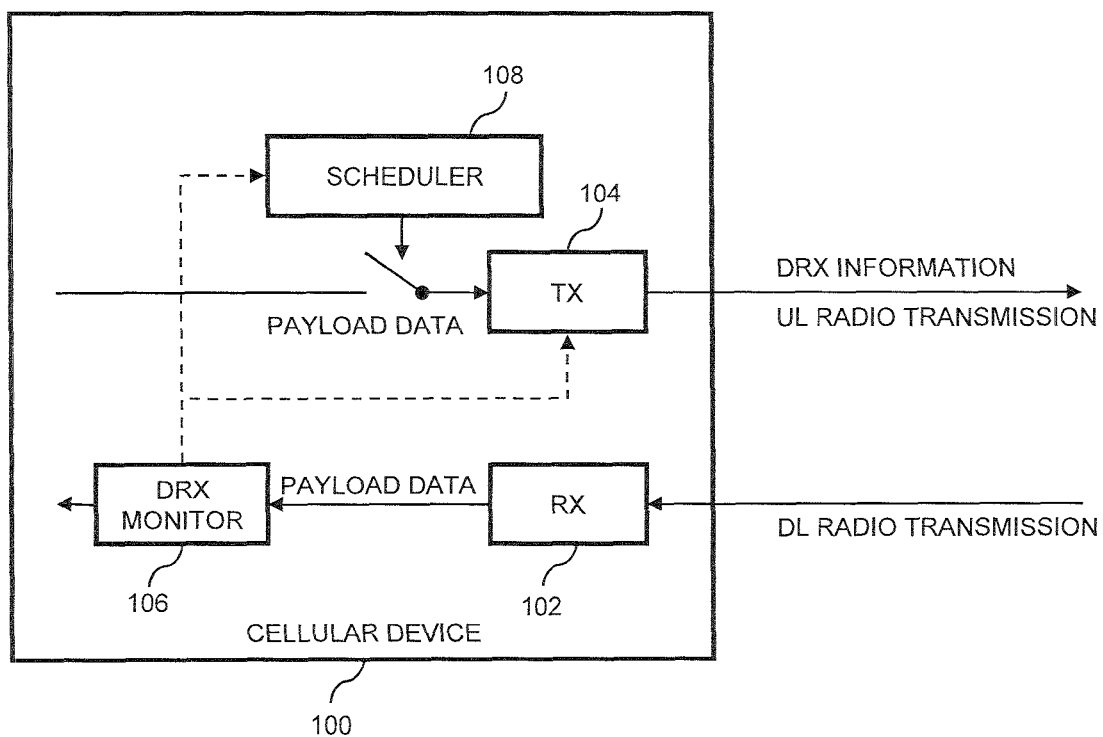
FIG. 9 schematically illustrates a further cellular device implementation according to an embodiment of the invention.

FIG. 9 shows an alternative implementation of the cellular device 100, which may be utilized if the cellular device 100 also provides input data to the sender 400 of the DL data packets, and these input data are used at the sender to generate the data to be included into the DL data packets sent to the receiver 100. That is to say, the implementation of FIG. 9 refers to a case where the cellular device 100 is also involved in the data acquisition for the sender 400. For example, this could be the case in a scenario like illustrated in FIG. 4, when both the actuator and the sensor are implemented in the cellular device 100.

The implementation of FIG. 9 is generally similar to that of FIG. 6. However, in this case the cellular device 100 is further provided with a scheduler 108. The scheduler 108 controls the timing of providing UL payload data to the TX module 104, which are then transmitted in an UL radio transmission towards the sender 400. For this purpose, the scheduler 108 uses the estimated parameters of the DRX cycle as provided by the DRX monitor 106, in particular the starting time TA of the DRX cycle and typically also the length of the DRX cycle. The scheduler 108 may thus operate to provide a timing of sending the UL payload data which ensures that responsive DL data packets arrive in the active period of the DRX cycle.

In the following, exemplary ways of evaluating the monitored packet arrival times of the DL data packets will be explained in more detail. In these explanations, the packet arrival time of a certain DL data packet will be referred to as TR. In addition, the amount of time which has passed since the last sending of an UL data packet by the receiver 100 may be utilized. In the following this time will be referred to as TS. Still further, the time difference between the last sending of an UL data packet by the receiver and the packet arrival time of a certain DL data packet may be utilized. In the following, this time difference is referred to as TD. Still further, an identifier of each DL data packet, e.g., in the form of an SHA-1 hash value or other kind of hash value, may be utilized to allow for matching information concerning a certain DL data packet reported by the receiver 100 with information concerning this DL data packet available at the sender 400. The above information items may be recorded by the receiver and stored in a database to be then used for evaluation at the receiver 100 and/or reporting to the sender 400.

In an exemplary evaluation method implemented at the receiver 100, the receiver may estimate the DRX parameter(s) from the recorded values of TR and TD. In a first step, data records for DL data packets for which the value of TD is less than a given time period T are discarded from further evaluation. The time period T may be set to be at least as long as the time it takes to close a PDP context after the receiver 100 stopped using the PDP context. Next, data records for DL data packets for which the value of TR is less than TR-T of the youngest DL data packet discarded in the first step are discarded from the further evaluation. Due to this discarding, data records may be filtered out while a PDP context was active due to communication being initiated by the receiver itself 100. The discarding may also be performed before storing the data records.

In the following the packet arrival times TR may be evaluated to detect packet bursts. For this purpose the inter-arrival times, i.e., the differences of TR between subsequent DL data packets may be evaluated. This may be accomplished by identifying the packet burst as a sequence of DL data packets with inter-arrival times below a certain threshold, e.g., in the range of a few ms, followed by an inter-arrival time above the threshold. As explained above, the beginning of a packet burst may be identified with the starting time TA of the active period of a DRX cycle. From the identified packet bursts, inter-burst times TB, i.e., the time intervals between the beginnings of two subsequent packet bursts may be evaluated. The inter-burst time TB are multiples of the length of DRX cycle. If all evaluated values of TB are equal, this value may be used as the estimate for the length of the DRX cycle time. If the evaluation yields different values of TB, the largest common denominator of these different values may be used as the estimate for the length of the DRX cycle. For example, if the evaluation yields values of 8 s, 6 s, and 4 s for TB, the estimated length of the DRX cycle time would be 2 s.

In some cases, the value estimated from TB may nonetheless be a multiple of the actual length of the DRX cycle, e.g., if there are some DRX cycles without packet bursts. This may be addressed by increasing the number of evaluated TB values or by occasionally causing the sender 400 to transmit DL data packets which would arrive at integer fractions of the estimated DRX cycle. The latter operation of the sender 400 may also be initiated on request by the receiver 100, e.g., when only a small number of values of TB could be measured or when changes in the pattern of packet arrival times are detected, indicating a potential change of the DRX cycle.

According to a further method, the data records for multiple received DL data packets may be subjected to a statistical analysis to detect the starting time of the active period, i.e., phase, and length of the DRX cycle. Various techniques for estimating frequency and phase information from a time dependent signal subject to noise may be used for this purpose, e.g., Fast Fourier Transform (FFT), linear regression analysis, and/or autocorrelation.

In some cases, such statistical analysis may yield multiple pairs of phase and frequency. In such cases, the further evaluation may be performed to select a most reasonable phase and frequency. For example, such further evaluation could exclude phase and frequencies corresponding to a length of the DRX cycle which is outside a typical range between hundreds of milliseconds to minutes.

According to a further method, the receiver 100 and the sender 400 may co-operate to estimate the parameters of the DRX cycle. For this purpose not only the packet arrival times TR at the receiver 100 but also the packet transmit times TT at the sender 400 may be considered. In this case the transit time of a DL data packet between the sender 400 and the receiver 100 can be precisely determined for each DL data packet by calculating the difference between its transmit time TT and its arrival time TR.

This evaluation may for example be performed at the receiver 100, using timestamps in the DL data packets which indicate when the DL data packet was sent by the sender 400. Alternatively, the receiver 100 may report the packet arrival times TR together with an identifier of each received DL data packet to the sender 400, and the sender 400 may use the identifier to correlate the reported packet arrival time TR to the recorded transmit time TT of this DL data packet.

The evaluated transit times of multiple DL data packets, i.e., a time dependent function of the travel time, may then be subjected to a statistical analysis to obtain phase and frequency information, using similar techniques as mentioned above.

The above co-operation between receiver 100 and sender 400 may require time synchronization between the receiver 100 and the sender 400. This may for example be achieved by synchronizing reference clocks of the receiver 100 and the sender 400 to a common clock signal, e.g., provided by the cellular network 200, or using the Network Time Protocol (NTP).

In some implementations, the Internet delay ID may be estimated to allow for a more precise control of the timing of data acquisition and/or sending of the DL data packets by the sender 400. In this case, the time of sending a certain DL data packet may be set precisely so as to ensure that the cellular network 200 can immediately forward the DL data packet to the receiver 100. The time of sending the DL data packet may for example be set in such a way that the DL data packet arrives at the gateway 80 when the next active period of the DRX cycle starts. For this purpose, the DL data packet may be sent at the starting time TA of this DRX cycle minus the estimated Internet delay ID. A worst case estimate of the Internet delay ID may for example be used for this purpose.

However, in some cases the Internet delay ID may vary considerably, e.g., from milliseconds to seconds, and a worst case estimate can therefore sometimes be excessively conservative. Accordingly, it is beneficial to utilize a more precise estimate which is preferably adapted in a dynamic manner. Such a more precise estimate may for example be obtained by measuring round-trip times between sending of DL data packets by the sender 400 and receiving corresponding acknowledgements from the sender. Alternatively, also reporting of the packet arrival times by the receiver 100 may be utilized to measure the total delay TD for transmission between the sender 400 and the receiver 100 and to estimate the Internet delay ID therefrom. In an adaptive approach, the total delay TD may be monitored on the basis of reports from the receiver, and if an abrupt increase in the total delay TD is detected the estimate of the Internet delay ID may be adapted to a higher value. In particular, such abrupt increase may be due to the DL data packets being received too late by the GW 80 so that buffering until the active period of the next DRX cycle is needed, which will result in an increase of the measured total delay TD which is in the range of the length of the DRX cycle. Also a too large estimate of the Internet delay ID causes an increase of the measured total delay TD above its minimum possible value for a given cellular network delay CD and Internet delay ID, because the DL data packets will be buffered due to being received too early at the gateway 80, i.e., before the start of the next active period of the DRX cycle. However, in this case the increase of the total delay TD is equal to the deviation of the estimated Internet delay ID from its real value, so that the effect on the measured total delay is less dramatic, which allows for distinguishing between the case of a too small estimate for the Internet delay ID and a too large estimate of the Internet delay ID, in the latter case the estimate for the Internet delay ID may be adapted to a smaller value and it can be checked if the measured total delay decreases in response. Accordingly, the estimate of the Internet delay ID may be adapted to minimize the measured total delay TD.

Figure 10:
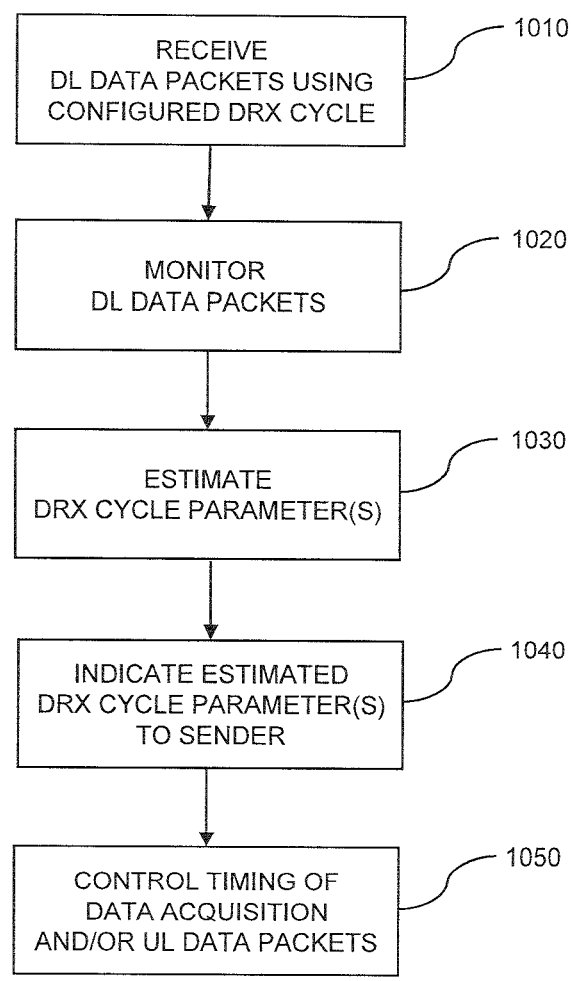
FIG. 10 shows a flowchart for illustrating a method according to an embodiment of the invention.

FIG. 10 shows a flowchart for illustrating a method for implementing the above-described concepts at a receiver, e.g., the receiver 100. The receiver may in particular be a receiver for receiving radio signals of a cellular network.

At step 1010, the receiver may receive DL data packets from a sender. The sender may for example be a node connected to the receiver over the cellular network and the Internet, such as the sender 400. The reception of the DL data packets is accomplished on the basis of a DRX cycle configured at the receiver. The DRX cycle may have a length in the range of 1 s or more. The DRX cycle includes an active period in which the receiver is available for receiving DL data packets, and a sleep period in which the receiver is not available for receiving DL data packets At step 1020, the receiver monitors the received DL data packets. This may in particular include recording packet arrival times. However, also other information, such as an identifier of each DL data packet, e.g., a hash value, or a time difference between the packet arrival time and the last time of sending an UL data packet by the receiver may be recorded. Also, a transit time of DL data packets between the sender and the receiver may be monitored.

At step 1030, the receiver estimates one or more parameter(s) of the DRX cycle. This is accomplished on the basis of information obtained by the monitoring of step 1020. The estimated parameters include at least the starting time of the active period of the DRX cycle, or phase of the DRX cycle. In addition, also a length of the DRX cycle may be estimated. The estimation may involve detecting bursts of data packets. Alternatively or in addition, statistical analysis may be applied to the monitored information.

At step 1040, the receiver indicates the estimated parameter(s) to the sender. The sender may then adjust its operation accordingly. For example, the sender may control the timing of sending the DL data packets according to the estimated parameter(s).

As indicated by step 1050, the receiver may also control the timing of acquisition of data and/or the timing of sending UL data packets according to the estimated parameter(s). This may for example be useful if the receiver provides the data to the sender, and the sender generates the DL data packets on the basis of the data, e.g., as explained in the scenarios of FIGS. 4 and 9.

Figure 11:
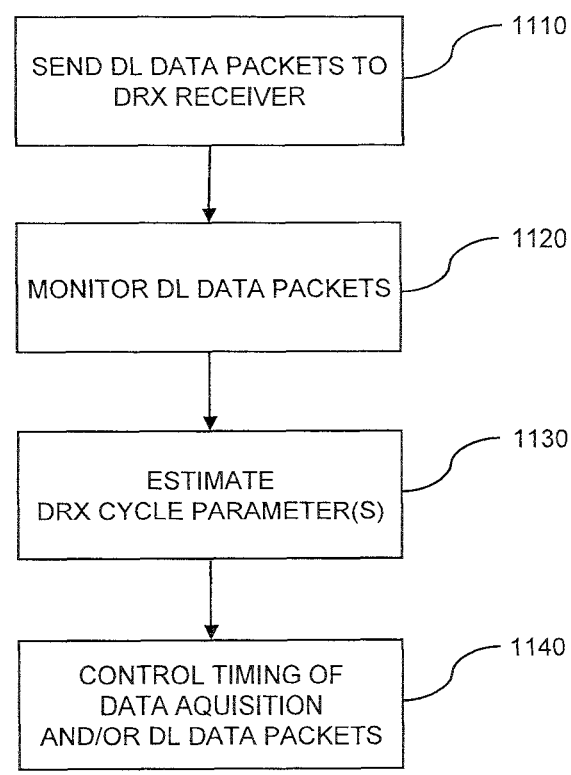
FIG. 11 shows a flowchart for illustrating a further method according to an embodiment of the invention.

FIG. 11 shows a flowchart for illustrating a method for implementing the above-described concepts at a sender, e.g., the sender 400. The sender may in particular be implemented in a node connected to the Internet.

At step 1110, the sender sends DL data packets to a receiver. The receiver may be connected to the sender over the cellular network and the Internet, such as explained for the receiver 100. The receiver uses DRX for receiving the DL data packets, on the basis of a DRX cycle configured at the receiver. The DRX cycle may have a length in the range of 1 s or more. The DRX cycle includes an active period in which the receiver is available for receiving DL data packets, and a sleep period in which the receiver is not available for receiving DL data packets At step 1120, the sender monitors the DL data packets. This may in particular include recording packet arrival times at the receiver. The packet arrival times may be reported from the receiver to the sender. In some cases, the sender may also monitor acknowledgements provided from the receiver to acknowledge receipt of the DL data packets. The monitoring may also involve recording other information, such as an identifier of each DL data packet, e.g., a hash value, a transmit time of each DL data packet from the sender, or a difference between the packet arrival time and the last time of sending an UL data packet by the receiver. Also, a transit time of DL data packets between the sender and the receiver may be monitored.

At step 1130, the sender estimates one or more parameter(s) of the DRX cycle. This is accomplished on the basis of information obtained by the monitoring of step 1120. The estimated parameters include at least the starting time of the active period of the DRX cycle, or phase of the DRX cycle. In addition, also a length of the DRX cycle may be estimated. The estimation may involve detecting bursts of data packets. Alternatively or in addition, statistical analysis may be applied to the monitored information.

At step 1140, the sender adjust its operation according to the estimated parameter(s). For example, the sender may control the timing of sending the DL data packets according to the estimated parameter(s). Further, the sender may control the timing of acquisition of data to be transmitted in the DL data packets according to the estimated parameter(s).

Figure 12:
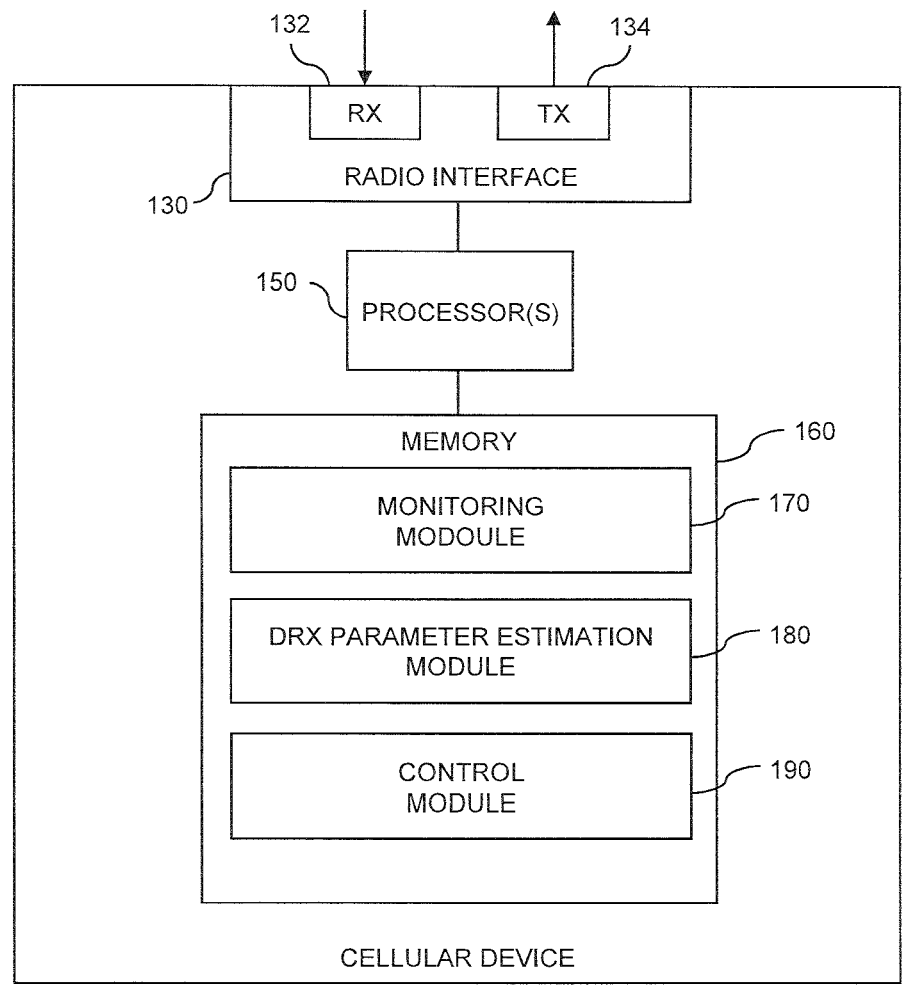
FIG. 12 schematically illustrates structures of a cellular device according to an embodiment of the invention.

FIG. 12 schematically illustrates exemplary structures for implementing the above-described concepts in a cellular device operating as the receiver.

In the illustrated structures, the cellular device includes a radio interface 130 for performing data transmission to or from the cellular network, e.g., the cellular network 200. It is to be understood that or implementing receive (RX) functionalities the radio interface 130 may include one or more RX modules 132, and for implementing transmit (TX) functionalities the radio interface 130 may include one or more TX modules 134.

Further, the cellular device includes one or more processor(s) 150 coupled to the radio interface 130 and a memory 160 coupled to the processor(s) 150. The memory 160 may include a Read-Only-Memory (ROM), e.g., a flash ROM, a Random Access Memory (RAM), e.g., a dynamic RAM (DRAM) or static RAM (SRAM), a mass storage, e.g., a hard disk or solid state disk, or the like. The memory 160 includes suitably configured modules of program code to be executed by the processor 150 so as to implement the above-described functionalities of the receiver. More specifically, the memory 160 may include a DRX monitoring module 170 for accomplishing the above-described monitoring of DL data packets. Further, the memory 160 may include a DRX parameters estimation module 180 for accomplishing the above-mentioned estimation of DRX parameters. Further, the memory 160 may include a control module 190 for performing various control operations as mentioned above, e.g., the entering and leaving of the sleep mode, controlling the sending of UL data packets, or indicating the estimated DRX parameters to the sender of the DL data packets.

It is to be understood that the structures as illustrated in FIG. 12 are merely schematic and that the cellular device may actually include further components which, for the sake of clarity, have not been illustrated, e.g., further interfaces, sensors, actuators, output devices, or additional processors. Also, it is to be understood that the memory 160 may include further types of program code modules, which have not been illustrated. For example, the memory 160 may include program code modules for implementing typical functionalities of a cellular device or program code modules of one or more applications to be executed by the processor(s) 150. According to some implementations, also a computer program may be provided for implementing concepts according to embodiments of the invention, e.g., by providing a computer-readable medium storing one or more of the program code modules 170, 180, 190 and/or making one or more of the program codes modules 170, 180, 190 available for download.

Figure 13:
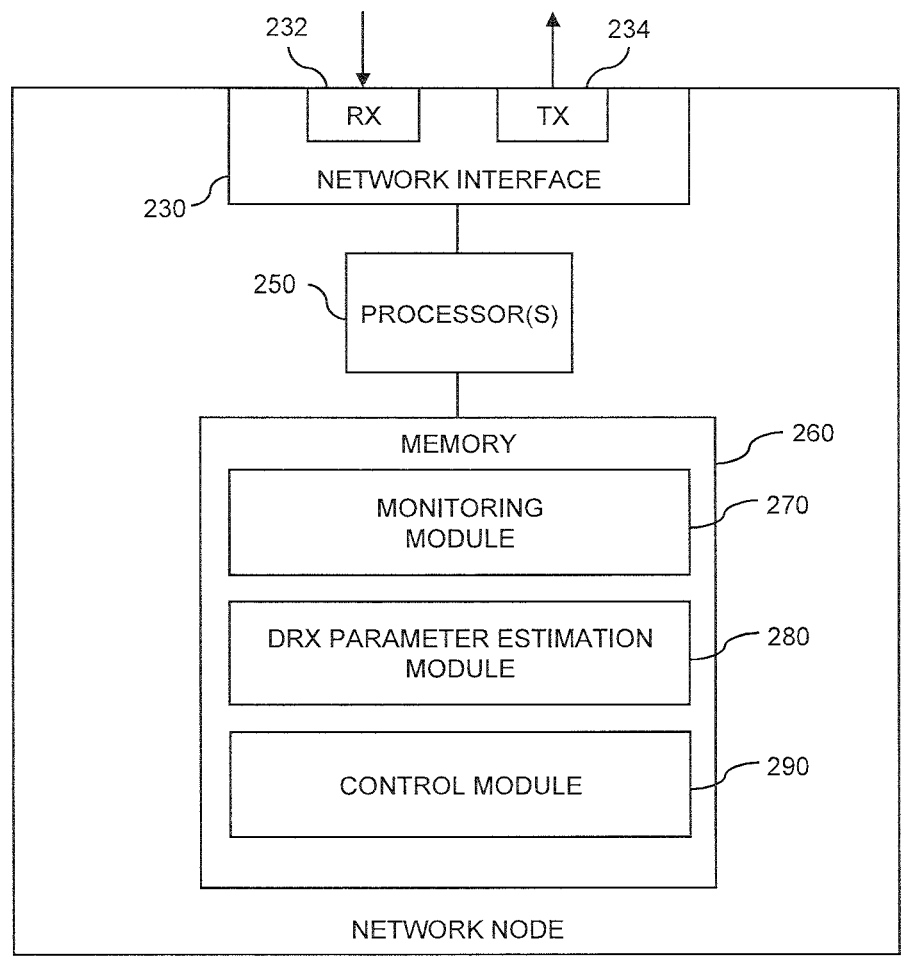
FIG. 13 schematically illustrates structures of a network node according to an embodiment of the invention.

FIG. 13 schematically illustrates exemplary structures for implementing the above-described concepts in a network node operating as the sender, e.g., in a server connected to the Internet.

In the illustrated structures, the network node includes a network interface 230 for performing data transmission to or from a network, e.g., the Internet. Specifically, the network interface 230 may be operable to send DL data packets over a cellular network to a receiver, e.g., to the receiver 100. It is to be understood that or implementing receive (RX) functionalities the network interface 230 may include one or more RX modules 232, and for implementing transmit (TX) functionalities the network interface 230 may include one or more TX modules 234.

Further, the network node includes one or more processor(s) 250 coupled to the radio interface 230 and a memory 260 coupled to the processor(s) 250. The memory 260 may include a ROM, e.g., a flash ROM, a RAM, e.g., a DRAM or SRAM, a mass storage, e.g., a hard disk or solid state disk, or the like. The memory 260 includes suitably configured modules of program code to be executed by the processor 250 so as to implement the above-described functionalities of the sender. More specifically, the memory 260 may include a DRX monitoring module 270 for accomplishing the above-described monitoring of DL data packets. Further, the memory 260 may include a DRX parameter estimation module 280 for accomplishing the above-mentioned estimation of DRX parameters. Further, the memory 260 may include a control module 290 for performing various control operations as mentioned above, e.g., controlling the timing of sending of the DL data packets and/or controlling the timing of the acquisition of data to be included into the DL data packets.

It is to be understood that the structures as illustrated in FIG. 13 are merely schematic and that the network node may actually include further components which, for the sake of clarity, have not been illustrated, e.g., further interfaces, or additional processors. Also, it is to be understood that the memory 260 may include further types of program code modules, which have not been illustrated. For example, the memory 260 may include program code modules for implementing typical functionalities of an Internet server or program code modules of one or more applications to be executed by the processor(s) 250. According to some implementations, also a computer program may be provided for implementing concepts according to embodiments of the invention, e.g., by providing a computer-readable medium storing one or more of the program code modules 270, 280, 290 and/or making one or more of the program codes modules 270, 280, 290 available for download.

As can be seen, the concepts as explained above may be used for efficiently estimating parameters of the DRX cycle used by a receiver, without requiring access to lower protocol layers implementing the DRX operation. The estimated parameters may be used for optimizing interaction of the sender and the receiver.

It is to be understood that the examples and embodiments as explained above are merely illustrative and susceptible to various modifications. For example, the concepts could be used in connection with other types of cellular network which differ from the above-mentioned example of an LTE cellular network. Also, the concepts may be used not only to support MTC cellular devices but also other types of UE. Further, it is to be understood that the above concepts may be implemented by using correspondingly designed software in existing devices, or by using dedicated hardware of such devices. Moreover, it is to be understood that the illustrated nodes or devices may be implemented by a single device or by a system of multiple interacting devices.

The invention claimed is:

1. A method for data transmission between a sender device and a receiver device, the method comprising:
    monitoring an indication of arrival times at the receiver device of data packets transmitted from the sender device to the receiver device;
    based on the indication of the arrival times of the data packets, estimating at least a starting time of an active period of a discontinuous reception cycle implemented at the receiver device; and
    controlling the timing of sending data packets from the receiver device to the sender device according to at least the estimated starting time of the active period,
    wherein the receiver device indicates to the sender device at least the estimated starting time of the active period of the discontinuous reception cycle implemented at the receiver device.

2. The method according to claim 1, comprising:
    on the basis of said monitoring, estimating a length of the active period.

3. The method according to claim 1,
    wherein said monitoring and said estimating are performed at the receiver device and on the basis of data packets received by the receiver device.

4. The method according to claim 1,
    wherein said monitoring and said estimating are performed at the sender device and on the basis of packet arrival times reported by the receiver device.

5. The method according to claim 1,
    wherein said monitoring and said estimating are performed at the sender device and on the basis of acknowledgements sent by the receiver device to the sender device to acknowledge receipt of data packets from the sender device.

6. The method according to claim 1,
    wherein said monitoring comprises determining inter-arrival times of data packets at the receiver device and, on the basis of the inter-arrival times, detecting bursts of data packets.

7. The method according to claim 1,
    wherein said monitoring comprises measuring a transit time of data packets between the sender device and the receiver device.

8. The method according to claim 1, comprising:
    controlling the timing of sending the data packets from the sender device according to at least the estimated starting time of the active period.

9. The method according to claim 1, comprising:
    controlling acquisition of data to be transmitted in the data packets according to at least the estimated starting time of the active period.

10. The method according to claim 1,
    wherein the sleep period of the discontinuous reception cycle is longer than 1 s.

11. A computer program product comprising a non-transitory computer readable storage medium storing program code executable by at least one processor of a receiver device to cause the receiver device to operate in accordance with a method according to claim 1.

12. A computer program product comprising a non-transitory computer readable storage medium storing program code executable by at least one processor of a sender device to cause the sender device to operate in accordance with a method according to claim 1.

13. A receiver device, comprising:
    an interface for at least receiving data packets from a sender device; and
    at least one processor, the at least one processor being configured to:
        monitor an indication of arrival times of the data packets received from the sender device,
        based on the indication of the arrival times of the data packets, estimate at least a starting time of an active period of a discontinuous reception cycle implemented at the receiver device;
        indicate to the sender device at least the estimated starting time of the active period of the discontinuous reception cycle implemented at the receiver device, and
        control the timing of sending data packets from the receiver device to the sender device according to at least the estimated starting time of the active period.

14. The receiver device according to claim 13, comprising:
    wherein the at least one processor is configured to estimate, on the basis of said monitoring, a length of the active period.

15. The receiver device according to claim 13,
    wherein said monitoring comprises determining inter-arrival times of data packets at the receiver and, on the basis of the inter-arrival times, detecting bursts of data packets.

16. The receiver device according to claim 13,
    wherein said monitoring comprises measuring a transit time of data packets between the sender device and the receiver device.

17. The receiver device according to claim 13,
    wherein the sleep period of the discontinuous reception cycle is longer than 1 s.

18. A sender device, comprising:
    an interface for at least sending data packets to a receiver device; and
    at least one processor, the at least one processor being configured to:
        monitor the data packets transmitted to the receiver device, receive, from the receiver device, an indication of an estimated starting time of an active period of a discontinuous reception cycle implemented at the receiver device; and on the basis of said monitoring and receiving, estimate the at least starting time of the active period of the discontinuous reception cycle implemented at the receiver device, wherein said monitoring and said estimating are performed on the basis of the indication comprising packet arrival times reported by the receiver device.

19. The sender device according to claim 18, wherein the at least one processor is configured to estimate, on the basis of said monitoring, a length of the active period.

20. The sender device according to claim 18, wherein said monitoring and said estimating are performed on the basis of acknowledgements sent by the receiver device to the sender device to acknowledge receipt of data packets from the sender device.

21. The sender device according to claim 18, wherein said monitoring comprises determining inter-arrival times of data packets at the receiver device and, on the basis of the inter-arrival times, detecting bursts of data packets.

22. The sender device according to claim 18, wherein said monitoring comprises measuring a transit time of data packets between the sender device and the receiver device.

23. The sender device according to claim 18, wherein the at least one processor is configured to control the timing of sending the data packets according to at least the estimated starting time of the active period.

24. The sender device according to claim 18, wherein the sleep period of the discontinuous reception cycle is longer than 1 s.

\* \* \* \* \*